(No Model.) 4 Sheets—Sheet 1.

W. THOMSON.
GALVANOMETER.

No. 412,140. Patented Oct. 1, 1889.

Attest:
F. A. Hopkins
Edward Stern

Inventor:
William Thomson
By Knight Bros
Attys (No Model.) 4 Sheets—Sheet 3.

W. THOMSON.
GALVANOMETER.

No. 412,140. Patented Oct. 1, 1889.

Attest:
F. A. Hopkins
Edward Stur

Inventor:
William Thomson
By F. Knight Bros
Attys.

(No Model.) 4 Sheets—Sheet 4.
W. THOMSON.
GALVANOMETER.
No. 412,140. Patented Oct. 1, 1889.
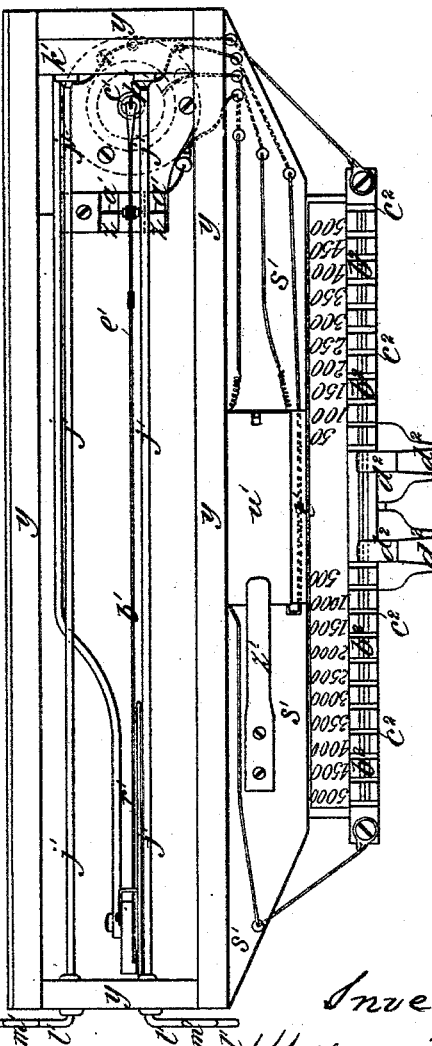
Fig. 5.
Fig. 5.b
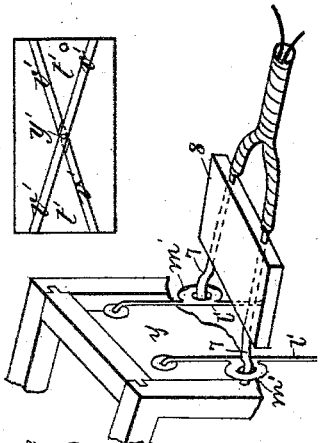
Fig. 5.a
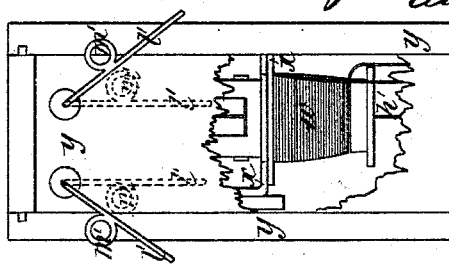
Fig. 4.
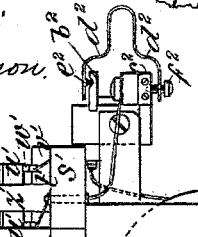
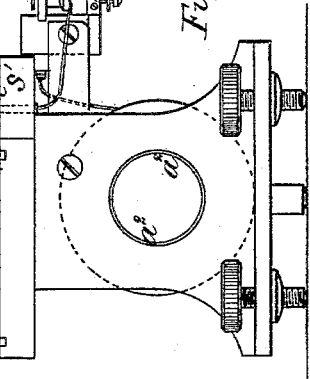
Inventor:
William Thomson
Attest:
F. A. Hopkins
Edward Stow
By Knight Bros.
attys

UNITED STATES PATENT OFFICE.

WILLIAM THOMSON, OF GLASGOW, COUNTY OF LANARK, SCOTLAND.

GALVANOMETER.

SPECIFICATION forming part of Letters Patent No. 412,140, dated October 1, 1889.

Application filed March 29, 1886. Serial No. 197,013. (No model.) Patented in England August 9, 1884, No. 11,106; in France April 11, 1885, No. 168,207, and in Belgium April 29, 1885, No. 68,695.

*To all whom it may concern:*

Be it known that I, Sir WILLIAM THOMSON, knight, of Glasgow, doctor of laws and professor of natural philosophy in the University and College of Glasgow, in the county of Lanark, Scotland, have invented Improvements in Apparatus for Measuring Electric Currents, (which have been patented in Great Britain August 9, 1884, No. 11,106; in France April 11, 1885, No. 168,207, and in Belgium April 29, 1885, No. 68,695,) of which the following is a specification, reference being made to the accompanying drawings, in which—

Figure 1:
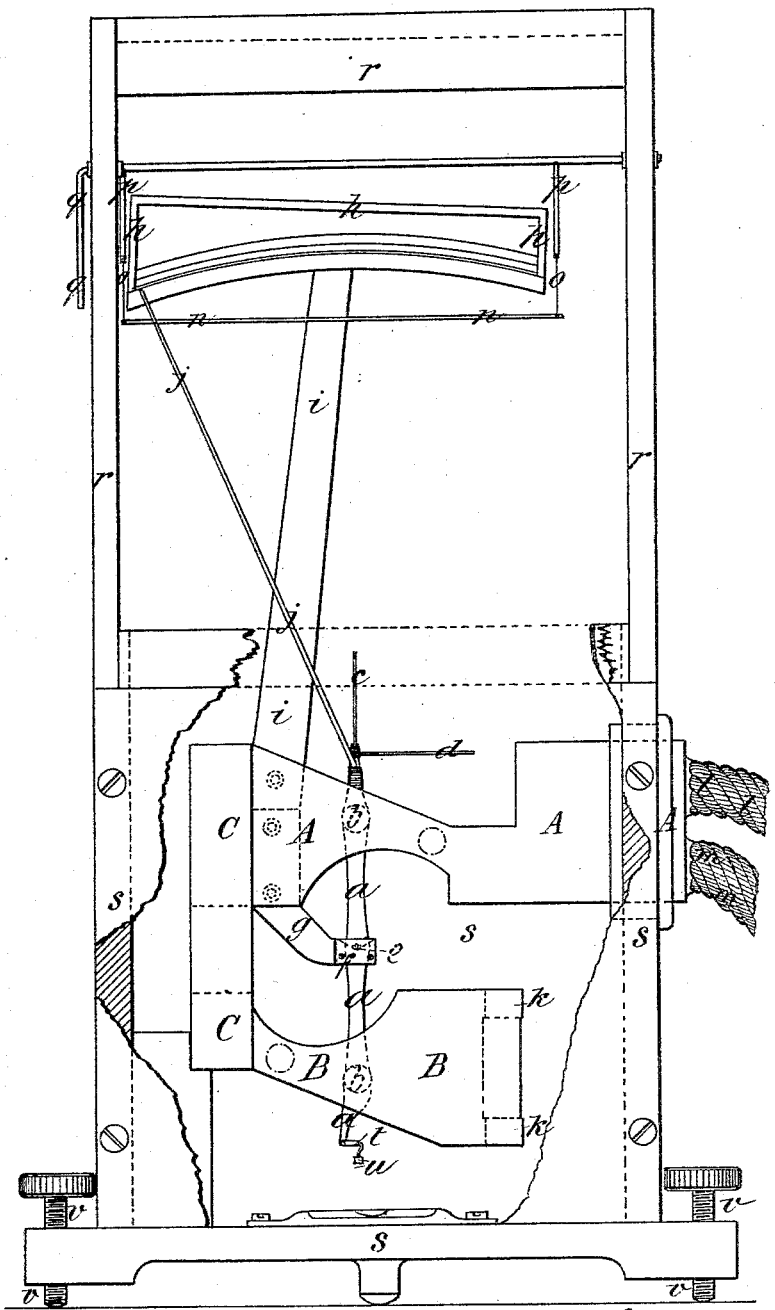
Figure 2:
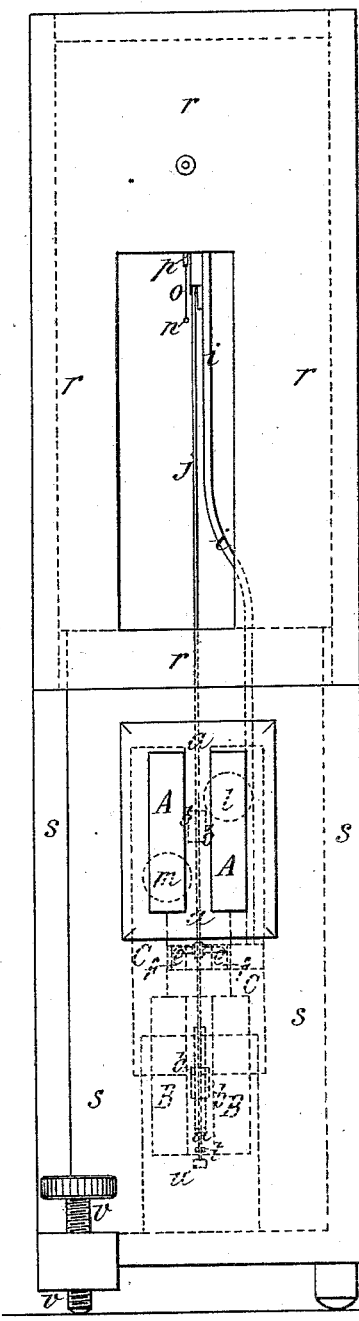
Figure 3:
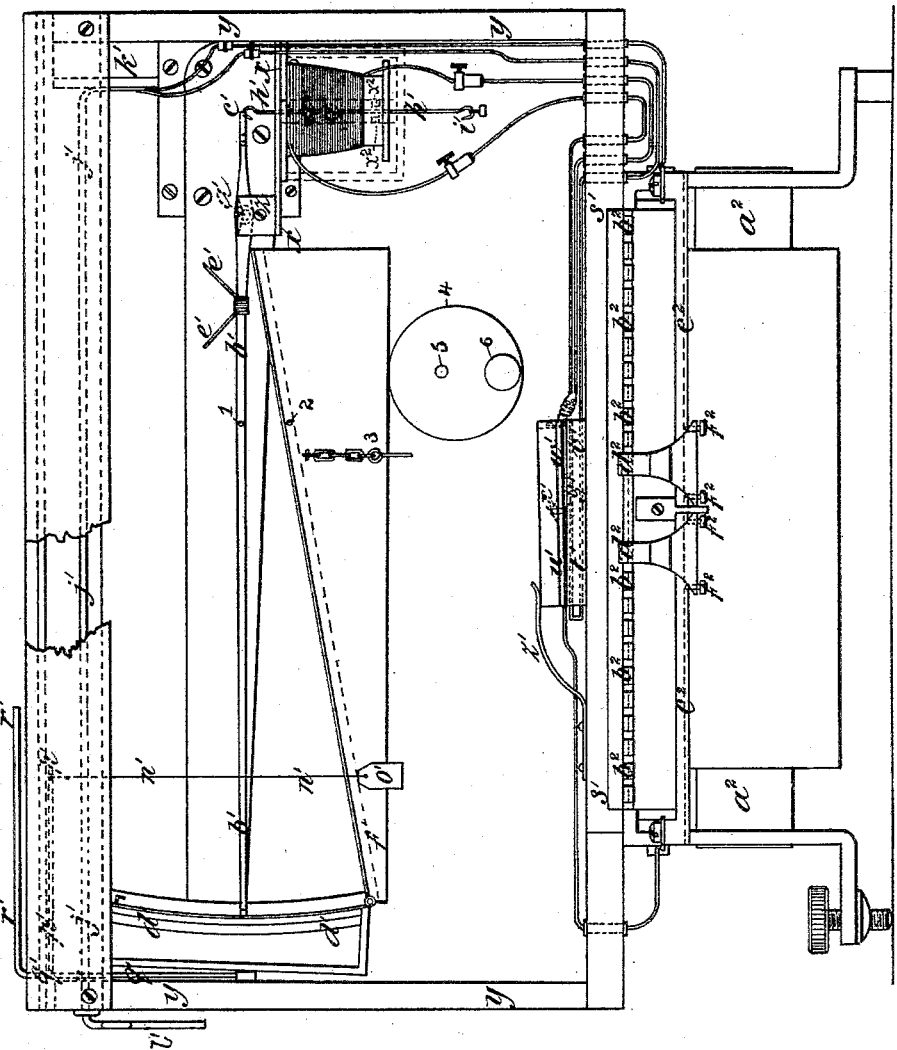

Figure 1 is a front elevation of a current-meter, the inclosing-casing being broken away to show the interior arrangements. Fig. 2 is an end elevation of the same. Figs. 3 to 5$^b$ illustrate a meter of greater resistance with additional adjustable resistance-coils.

Having by mathematical reasoning been led to expect that a mass of soft iron, if spherical or of an elongated shape, provided the length bears not too great a proportion to the breadth or to the shortest diameter, experiences forces in a magnetic field which are but little affected by residual magnetism, and which are very nearly proportional to the rate per unit of distance at which the square of the intensity of the magnetic force of the field varies from place to place in any direction, the means hereinafter set forth have been devised for applying this mathematical conclusion for the measurement of electric currents. A conductor of electricity is made of such shape and such form as to give a magnetic field with suitable variation of the intensity of its magnetic force in a space through which a small piece of soft iron can travel while properly supported for measuring the force required to balance it in any position. A suitable distribution of the electro-magnetic force for some purposes, especially for a very accurate standardizer, is when the square of its magnitude varies through the used part of the field directly as the distance from a point in the prolongation of the line in which the piece of soft iron moves, because this law makes the force experienced by the piece of soft iron independent of its position in the field. This condition or any modified condition to give convenient lengths of scale-divisions, may be fulfilled by trial with any desired accuracy by taking a single flat conductor or a flat conductor doubled back upon itself and cutting it to different breadths in different parts in the neighborhood of the space through which the soft iron is to move, the line of motion being approximately parallel to the line of the current. In this case, and when the instrument is designed for use on land, the method which is preferred for supporting the soft iron is to secure it on one end of a balance-arm properly counterpoised, so that the virtual center of gravity of the whole is as nearly as possible in the line of the bearing knife-edges. To counterbalance the action of the electro-magnetic force a weight is hung on a knife-edge attached to the arm or on a hook attached to the bottom of the piece of soft iron, this last arrangement being convenient when the electro-magnetic force is upward. The weight is varied according to the square of the strength of the medium current in the use that is made of the instrument.

An instrument for measuring electric currents constructed according to the principles hereinbefore set forth and fulfilling the condition that the motion of the soft-iron mass shall be in a direction parallel to the direction of the current is represented at Figs. 1 and 2 of the annexed drawings, these being respectively a view partly in front elevation and partly in vertical section and a side elevation. In this instrument the balance-arm $a$ carries two soft-iron masses $b$, situated so that each is in a magnetic field due to the current flowing through the conductor, which is hereinafter more particularly described.

The balance-arm $a$ is counterpoised by the arms $c$ and $d$, according to the principles hereinbefore set forth, and is supported by the knife-edges $e$, resting upon the V-grooves $f$, carried by the plate $g$. A knife-edge support $t$ is provided at the lower end of the balance-arm $a$ for the suspension thereon of the weight $u$, employed in the action of the instrument, as hereinbefore described. A suitable arrangement for a paper or equivalent scale is carried by the frame $h$, secured by the arm $i$ to the conductor of the instrument, so as to prevent any error due to shifting relatively to the pointer $j$, secured to the balance-arm $a$.

The conductor of the instrument is of copper, and in the case represented at Figs. 1 and 2 of the annexed drawings is of considerable cross-sectional area, as shown more particularly at Fig. 2. The conductor consists, essentially, of two horizontal portions A and B, connected by the vertical portions C; but in order to avoid circumlocution it may be supposed to be thus constituted: Two copper plates of the requisite thickness are cut according to the shape of the outline, which is at Fig. 1 represented as inclosing the three connected parts A, B, and C, respectively, their outer or upper and lower edges being parallel and their inner edges being cut away on a curved line, so as to form in each plate a narrow neck or strip, which necks project in opposite directions—that is, the said necks of the plates forming the conductor B project toward and are secured to the conductors C, while those of the plates composing the conductor A project toward the terminals, (hereinafter described,) so that when the balance-arm $a$ oscillates both of the pieces $b$ of soft iron will be either carried between the necks or between the wider portions of the plates. The radius of the curve upon which the plates or conductors are cut away is immaterial, so long as it be such as will leave approximately equal portions of the metal on both sides of the path of the pieces $b$ and will enable one of such pieces never to be in a wider field than the other. This form is the result of experiment, and has been found to be such as gives a scale having approximately equal divisions of convenient size for equal increments of current throughout the greater portion of the range. These plates have their adjacent surfaces parallel, and, it may be supposed, are metallically connected at $k$ in such a manner that together they form a continuous metallic circuit between the terminals, which upon the annexed drawings are represented in the form of stranded copper-wire cables $l$ and $m$. These may be provided with any convenient arrangement for putting the instrument into or removing it from an electric circuit.

The shape given to the conductors A and B at the parts adjacent to the masses $b$ is that by which there is obtained in the field traversed by the said soft-iron masses $b$, by means of a current flowing through the conductor, the requisite disposition of magnetic force. To prevent undue oscillation of the pointer $j$, there is provided a light aluminium tube $n$, suspended pendulum-wise by two fibers or fine threads $o$ to the arms $p$. A crank handle or lever $q$ outside the case enables the tube $n$, by motion of the arms $p$, to be brought close up to and to touch the pointer $j$, and thus by the friction between the tube $n$ and the pointer $j$ stops any such oscillations. A case having at its upper part a glass front protects the instrument from currents of air and from dust. The upper part $r$ of this case is of wood, while the lower part $s$ consists of an iron casing, which surrounds but is insulated from the conductor of the instrument, in order to prevent magnetic matter in the neighborhood from injuriously affecting the magnetic field or fields of the instrument. The instrument is provided with leveling-screws $v$ and a spirit-level to enable the said instrument to be properly adjusted.

In order to annul any residual magnetism that may be supposed to remain in the soft-iron masses $b$, a reversing-key is provided for effecting rapid reversals of the current. This key is constructed in a manner analogous to that hereinafter described with reference to Figs. 3, 4, 5, $5^a$, and $5^b$, except that the contacts are made by suitably-connected pins carried by the movable part $u'$ dipping into mercury-cups formed in the fixed part $t'$.

It is preferred for some purposes to make the line of motion of the soft-iron masses approximately perpendicular to the current. When the current to be measured is so small that a moderately-fine wire or flexible insulated conductor of considerable length can be used, the easiest way of producing a field to fulfill the desired condition is by winding the conductor on a cylindrical or conical core, so as to fill up the space to an outer boundary, which may be of cylindrical or conical or conoidal figure. The instrument so constituted is suitable for measuring either continuous or alternating currents; but for alternating currents the bobbin must be of insulating material, and for this purpose it is preferred to form the tube of such bobbin of several rounds of paper hardened by shellac, varnish, or other suitable cement, with ends of vulcanite or other convenient insulating material.

When the instrument is designed for measuring continuous currents, the bobbin is inclosed within an iron cylinder or sheath, so as to nearly annul the influence on the interior magnetic field of terrestrial magnetic force or magnetic forces due to external magnets or electric machines in the neighborhood.

An instrument constructed upon these last-mentioned principles and fulfilling the condition that the direction of motion of the soft-iron mass shall be partially perpendicular to the direction of the current is represented at Figs. 3 to 5 (inclusive) of the annexed drawings, Fig. 3 being a front elevation, Fig. 4 part end elevation and part section, and Fig. 5 a plan. The electro-magnetic coil $w$, of the form represented at Figs. 3 and 4, is supported by the brass frame-work $x$, so that the core of the said coil $w$ is in a vertical position. The form of this helix or coil $w$ is preferably somewhat conoidal and is wider at the top than it be supposed, as an example, that X represents fourteen hundred and forty. Then No. I equals fourteen hundred and forty milligrams, No. II equals three hundred and sixty milligrams, No. III equals one hundred and sixty milligrams, No. IV equals ninety milligrams, and No. V equals 57.6 milligrams. To mark the divisions on the scale of either of the current-meters herein last mentioned, the instrument is connected in series with any convenient form of indicator or measurer which is capable of showing very small variations in a current flowing through the circuit at any time. There must also be in the circuit a convenient arrangement for throwing in or taking out resistance, so as to provide a means of adjusting the strength of the current to maintain it constant with a current of constant amount flowing through the electro-magnetic coil. Marks are made on the scale at the positions indicated by the pointer when each of the separate weights are successively and progressively hung on the bottom hook of the plunger. The positions so ascertained are marked on the scale and numbered, respectively, 10, 20, 30, 40, and 50, taking the weights in the order I to V. Another series of points on the scale are found by using a current of such amount as brings the pointer to the position marked 40 when the weight V is on the bottom hook of the plunger, keeping the current constant at the amount so formed by experiment, the weights IV, III, II, and I are successively used, and the points on the scale so determined are numbered, respectively, 32 24 16 8, these numbers being obtained by observing that the value assigned to the first point determined by, say, the weight IV, is to the value assigned to the second point, determined by the same weight, in the proportion of five to four. In a similar manner, beginning with the weight V at division 30, the points 24 18 12 6 may be ascertained. The remaining points necessary to complete the scale may be filled in by interpolation from the points already determined by the procedure hereinbefore set forth, or there may before completing the scale by interpolation be determined one or more points between the 40 and 50 of the scale by properly-selected weights according to the principle hereinbefore described with reference to the preparation of weights I to V. The scale so constructed may be used with any weight which is found convenient for the purpose to which the instrument is to be applied, whether for measuring millampéres, ampéres, or large multiples of ampéres, and the indications on the scale, multiplied by a constant depending on the weight used, give the measurement of the current in absolute value.

For convenience in practice the magnitude of the weights may be such as to eliminate the employment of the constant multiple last referred to and to fulfill the condition that the divisions of the scale each indicate the ampéres of the current measured in submultiples of ten, units, or multiples of ten.

I claim—

1. In an apparatus for measuring electric currents, the combination of a movable mass of soft iron having the ratio of its greatest to its least diameter comparatively small, an indicator connected therewith, and an adjacent conductor having approximately equal fields of electro-magnetic force on both sides of said soft-iron mass, and being wound or shaped so that the current passing through it will produce a non-uniform field of electro-magnetic force about the said soft-iron mass.

2. In an apparatus for measuring electric currents, the combination of a movable mass of soft iron and an indicator connected therewith, an adjacent electric conductor for producing a magnetic field about said mass, and a reversing-key in circuit with the said conductor, by which any residual magnetism may be dispelled.

3. In an apparatus for measuring electric currents, the combination of a movable mass of soft iron and an indicator connected therewith, and the adjacent electric conductor having approximately equal fields of electro-magnetic force on both sides of said soft-iron mass, and being irregularly shaped or wound, so that the current passing through it will produce a non-uniform field of electro-magnetic force about the said mass.

4. The method of graduating electric meters, which consists in placing the meter under a constant electrical influence, then placing a series of weights upon the movable indicating member, which are inversely proportional to the squares of the forces to be indicated, and marking the different positions of the meter in said indicating member.

In testimony whereof I have signed my name to this specification in the presence of two subscribing witnesses.

WILLIAM THOMSON.

Witnesses:
ST. JOHN VINCENT DAY,
HENRY HART,
*Both of* 115 *St. Vincent Street, Glasgow.*